United States Patent Office 2,697,096
Patented Dec. 14, 1954

2,697,096

PROCESSES FOR THE PRODUCTION OF SUBSTITUTED PYRIDINIUM COMPOUNDS

Hans Lettré, Heidelberg, Werner Haede, Frankfurt am Main, and Eva Ruhbaum, Heidelberg, Germany, assignors to Schenley Industries, Inc., New York, N. Y.

No Drawing. Application November 28, 1950, Serial No. 198,036

Claims priority, application Germany December 6, 1949

8 Claims. (Cl. 260—239.5)

This invention relates, generally, to processes for the synthesis of organic chemical compounds and, more particularly, it is concerned with processes for the synthesis of organo-pyridinium salts, especially nuclear nitrogen quaternary salts of 3-carbamyl-pyridine or nicotinamide.

It is known that certain reactive halides of the aliphatic or aromatic series are capable of addition to nicotinamide to form pyridinium type compounds but, although this method is satisfactory for the synthesis of the lower alkyl pyridinium type compounds because the lower alkyl halides are highly reactive, it is unsuitable for the synthesis of the higher alkyl and the unsubstituted aryl and aralkyl compounds, due to the relative inactivity of their halides. It is known also that the chlorine atom of 2:4-dinitro-chlorobenzene is made sufficiently reactive by the nitro groups that it is capable of reacting with pyridine to form 2:4-dinitrophenyl-pyridinium chloride and it is further known that when this addition product is treated with aniline, ring schism occurs with formation of the anilide of glutaconic aldehyde, a so-called polymethine dye. Because of this resultant cleavage of the pyridine nucleus, it is obvious that these reactions would not be regarded as a satisfactory route toward the synthesis of substituted pyridine or pyridinium compounds.

In accordance with this invention, a process is provided for the synthesis of organo-pyridinium salts generally, and especially nuclear nitrogen quaternary salts of nicotinamide, which utilizes the reaction between primary amines and a 2:4-dinitrophenyl-pyridinium salt, whereby, unexpectedly, schism of the pyridine nucleus does not occur.

The process of this invention involves the reaction of a 2:4-dinitrophenyl-pyridinium halide, particularly the 2:4-dinitrohalobenzene addition salt of nicotinamide, with a primary amine, in an inert organic liquid reaction medium, the reaction temperature being about room or above but preferably not more than about 100° C. The process may be represented as follows:

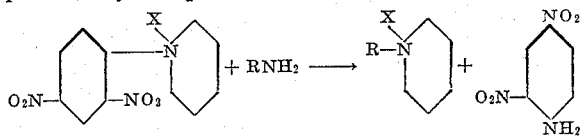

wherein R is an aliphatic or aromatic radical and X is a halogen anion. When the reaction is applied to an addition product of a 2:4-dinitrohalobenzene and nicotinamide, the above formulae would be modified to indicate a carbamyl substituent at the beta position of the pyridine and pyridinium nuclei.

It is preferred, when utilizing the invented process, to use, as one of the primary reactants, a N-(2:4-dinitrophenyl)-pyridinium chloride, for example and preferably, 3 - carbamyl - N - 2:4 - dinitrophenyl-pyridinium chloride. Corresponding other pyridinium halides such as the bromides and iodides may also be used, if desired, but generally the chlorides are to be preferred because of their higher degree of reactivity. The organic radical of the primary reactant amine may be almost any desired substituted or unsubstituted hydrocarbon residue, whether alkyl, aryl or aralkyl, and whether of natural or synthetic origin, provided it does not have functional groups that would interfere with the reaction by introducing undesirable by-reactions. The availability of alternative, perhaps simpler or more commercially attractive processes for the synthesis of N-alkyl-pyridinium halides suggests that application of the invented process to the synthesis of this type of compound is subordinate in importance, although being entirely feasible and operative, compared to the synthesis of the wide variety of N-aryl or N-aralkyl pyridinium compounds for which, hitherto, no satisfactory method of synthesis has been available.

The proportions in which the primary reactants are present in the reaction zone is not critical except in the sense that waste of one reactant, due to a deficiency of the other reactant, obviously should be avoided. It has been found that the most satisfactory results are obtained if an excess of the primary reactant amine is used, preferably about two mols of amine per mol of the N-(2:4-dinitrophenyl)-pyridinium halide, and the excess amine may be recovered subsequently from the reaction mixture. If the use of excess primary reactant amine is undesirable because of cost or for other reasons, the process may be carried out satisfactorily using merely equimolecular proportions of the reactants, provided one of the reactants is introduced, portion-wise, into the reaction zone.

The reaction medium employed in the process of this invention may be any inert organic liquid which is capable of serving as a solvent for the primary reactants or which is capable of bringing them into reaction with each other to yield the desired reaction products. The lower aliphatic alcohols, such as, for instance, methanol or ethanol, and predominantly alcoholic aqueous mixtures containing these alcohols, may be employed with satisfactory results. The use of an alcoholic or similar inert polar organic solvent medium in this process has the advantage that the chief by-product of the reaction, 2:4-dinitroaniline, may be maintained as a solute in the medium after the reaction, while the desired reaction product may be discharged from solution by addition of a miscible non-polar organic solvent such as ether.

The substances obtained by utilizing the process of this invention may be employed per se as pharmaceuticals and also may be used as intermediates in the synthesis of other organic compounds of like utility.

In addition to this process, which is of wide utility in the synthesis of organo-pyridinium type compounds generally, the present invention includes the application of the principles of this process to treatment of desacetyl-colchicine.

To facilitate a better and more complete understanding of how the principles of this invention may be applied for the synthesis of specific substances, illustrative embodiments of the invention will now be described. In each of these examples, one of the primary reactants is the addition product of nicotinamide and 2:4-dinitrochlorobenzene, which may be prepared as follows:

About 4 grams of nicotinamide and about 20 grams of 2:4-dinitrochlorobenzene are reacted by heating together at 100° C. for one hour, then the reaction mixture is dissolved in 30 cc. of methanol and treated with 300 cc. of hot ether, causing the pyridinum type addition salt to precipitate. These precipitation steps are repeated twice, then the substance is dissolved in 100 cc. of water, treated with animal charcoal, filtered and the filtrate is concentrated and dried in vacuo at 120° C. The residual yellowish product is dissolved in a small quantity of methanol and ether is carefully added until the mixture becomes turbid. On standing, the addition product, 3-carbamyl-N-(2:4-dinitrophenyl)-pyridinium chloride, deposits on the walls of the flask as colorless crystals, which may be recrystallized by dissolving it in methanol and then precipitating it by adding ether. This substance, hereinafter referred to as the nicotinamide addition product, melts at 75° C. and sinters at 120° C.

Example 1

About 1.5 grams of the nicotinamide addition product are boiled on a water-bath with 1.5 grams of benzylamine in 20 cc. of methanol for 3 hours. After adding 50 cc. of water the methanol is distilled and the 2:4-dinitroaniline is filtered off after cooling. The filtrate, decolorized with animal charcoal, is evaporated to dryness and the residue is recrystallized from absolute alcohol. The yield amounts to 0.91 gram, which is about 88% of the theoretical. This product, 3-carbamyl-N-benzyl-pyridinium chloride, which melts at 235–236° C., has properties identical with those reported of the product produced by Karrer and Stare (Helv. Chim. Acta, 20, 422 (1937)).

*Example 2*

About 9.4 grams of benzylamine are dissolved in 5 cc. of methanol and reacted with a solution of 0.5 gram of the nicotinamide addition product dissolved in 5 cc. of methanol. An intense red coloration occurs immediately, which on gently heating on the water-bath, changes to yellow in a few minutes. On adding 80 cc. of ether to the solution, a light yellow flocculent precipitate forms which is removed and dissolved in some dilute methanol. On adding ether, 3-carbamyl-N-benzyl-pyridinum chloride crystallizes as a colorless substance, melting at 234–235° C. The yield amounts to 0.35 gram, which is about 91% of the theoretical.

*Example 3*

About 3 grams of the nicotinamide addition product and 3 grams of aniline are boiled in 50 cc. of ethanol for 8 hours. Half of the solvent is then evaporated and the residual mixture is treated with 200 cc. of water. After cooling, the solution is filtered and the filtrate is decolorized with animal charcoal. About 1.5 grams of concentrated hydrochloric acid and 200 cc. of a saturated solution of mercuric chloride are added and the mercuric chloride pyridinum double salt is recrystallized from water three times. The yield of this product, the double salt of mercuric chloride and 3-carbamyl-N-phenyl-pyridinium chloride, amounts to about 3.65 grams of colorless needles, corresponding to 51% of the theoretical, and its melting point is at 151° C.

On decomposing the aqueous solution of the double salt by treatment with hydrogen sulfide, filtering and concentrating the filtrate in vacuo, 3-carbamyl-N-phenyl-pyridinum chloride is obtained which melts at 206–209° C.

*Example 4*

An aqueous methanolic solution of 4′-methoxystilbylamine, obtained as the free base from 0.9 gram of the hydrochloride, is reacted with about 0.3 gram of the nicotinamide addition product dissolved in methanol, the total volume of the mixture being about 10 cc. The red solution so obtained is gently heated on a water-bath for 10 minutes, during which period it turns yellow, and, after concentrating it by evaporation in vacuo to some extent, ether is added. A yellowish oil separates, which is dissolved in a small quantity of methanol and precipitated by addition of ether. These precipitation operations are repeated until a colorless amorphous solid, which cannot be crystallized, is obtained. The substance, after being dried for 3 days over phosphorus pentoxide, becomes oily when exposed to air and melts at 180° C. after sintering from about 80° C. on. It is 3-carbamyl-N-(4′-methoxystilbyl)-pyridinum chloride.

*Example 5*

About 1 gram of 4′-ethoxy-stilbylamine is added in portions, after the initial red coloration of the solution has disappeared, to a solution of 1 gram of the nicotinamide addition product in 10 cc. of methanol, and the mixture is boiled on a water-bath. Completion of the reaction is indicated when no red coloration occurs on adding more amine. After addition of 50 cc. of water, the methanol is distilled off and the cooled solution is filtered. The filtrate is purified with animal charcoal and evaporated to dryness in vacuo, yielding a residue which, after being dissolved in methanol, is precipitated by addition of ether. After drying, the amorphous residue, which consists of 3-carbamyl-N-(4′-ethoxystilbyl)-pyridinium chloride, weighs 0.93 gram. The double compound, obtained by treating this substance with mercuric chloride, melts in the range of 140 to 180° C., with decomposition.

*Example 6*

A methanol solution of 7-cholesterylamine, obtained by liberation of the free base from about 1.8 grams of the amine hydrochloride, is reacted with 0.5 gram of the nicotinamide addition product in methanol, the total volume of the solution being about 30 cc. The red solution thus obtained is heated on a water-bath for 15 minutes, during which period the color changes to yellow, then, after concentrating the solution in vacuo to about 10 cc., ether is added until turbidity occurs. On standing, 3-carbamyl-N-cholesteryl-pyridinum chloride precipitates as crystals. Precipitation is completed by adding more ether, then the product is removed by filtration and recrystallized from ethanol containing a small amount of ether. Colorless crystals are obtained which melt at 217–218° C. and sinter from 142° C. on. The yield amounts to 0.43 gram, which is about 51.5% of the theoretical.

*Example 7*

About 0.07 gram of estramine is dissolved in 10 cc. of methanol and reacted with 0.04 gram of the nicotinamide addition product in some methanol. The solution becomes red and turbid and floccules of a somewhat oily red substance form, but after heating on a water-bath for 10 minutes, it becomes yellow and clear. Upon adding ether, a light yellow precipitate deposits immediately. This product has a melting point at 305°, although decomposition starts at about 270° C. The yield amounts to 0.05 gram, corresponding to 86.4% of the theoretical.

For analysis, the separated precipitate is dissolved in dilute methanol and precipitated by addition of ether, then finally recrystallized from dilute methanol. Colorless crystals are obtained which melt at 312° C., although decomposition starts at about 275° C. The product is very difficultly soluble in water.

*Example 8*

About 2 grams of the nicotinamide addition product, dissolved in 20 cc. of methanol, is gradually added to a solution of about 2 grams of p-sulfonamido-benzylamine in 20 cc. of methanol, while slightly heating on a water-bath. The solution becomes red initially, then immediately changes to yellow. Ether is added, causing a yellow-brown amorphous substance to precipitate, which is removed, dissolved in water, boiled with activated carbon, filtered and the water is evaporated in vacuo. The residue is twice recrystallized from dilute methanol, to produce salmon-pink crystals which melt at 243–245° C. The yield of this product, 3-carbamyl-N-(4′-sulfonamidobenzyl)-pyridinium chloride, amounts to approximately 1.7 grams, which is about 84.6% of the theoretical. After being recrystallized several times from dilute methanol and finally from water until the crystals have become colorless, a highly purified product is obtained having a melting point at 246° C.

*Example 9*

About 1.7 grams of desacetylcolchicine and 0.6 gram of the nicotinamide addition product, dissolved in 30 cc. of methanol, are gently heated on the water-bath for 10 minutes. The initially red solution changes to brown yellow. On adding ether, a reddish oily material is discharged from the solution, which completely separates only after standing for a few hours, after which period the supernatant solvent is decanted and precipitation is repeated. The residue is dissolved in water, filtered and evaporated to dryness on a water-bath. Then the product is dissolved in methanol and precipitation is effected again by addition of ether. A light brown, solid product precipitates. It is treated with a small amount of absolute alcohol, which takes on a red coloration, and a colorless undissolved residue remains which is dissolved in dilute methanol and crystallized by addition of a small amount of ether. Colorless crystals are obtained which melt at 236–238° C. The yield amounts to 0.35 gram, corresponding to 38% of the theoretical.

Although the exact chemical structural formula of this product is not known with certainty at the present time, it is believed that desacetylcolchicine is a primary amine, the so-called trimethylcolchicinic acid of the formula:

$$C_{16}H_9O(OCH_3)_3(OH)NH_2$$

which suggests that the probable formula of its carbamyl-pyridinium chloride complex would be:

$$C_{16}H_9O(OCH_3)_3(OH) \cdot C_6H_6ON_2Cl$$

or the aggregated empirical formula:

$$C_{25}H_{27}O_6N_3Cl$$

This novel compound, when in its reduced or enolic form, is a potent mitotic poison, whereas in its oxidized or keto form, it lacks this type of physiological activity.

What is claimed is:
1. The process that comprises reacting, in a liquid reaction medium predominantly comprised of an aliphatic alcohol having at most two carbon atoms per molecule, at a temperature within the range of room temperature upward to about 100° C., 3-carbamyl-N-(2:4-dinitrophenyl)-pyridinium chloride with a primary amine of the formula RNH₂ wherein R is the remainder of the amine molecule that is linked to the amino group, said primary amine being chosen from the group consisting of monohomocyclic aromatic primary amines, 4'-alkoxy-4-amino-stilbenes, cholesterylamine, estramine and desacetylcolchicine; and thereafter recovering from the reaction mixture a reaction product of the formula:

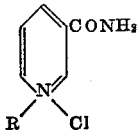

wherein R has the meaning above assigned.

2. The process as defined in claim 1 wherein the primary amine is a monohomocyclic aromatic primary amine.
3. The process as defined in claim 1 wherein the primary amine is p-sulfonamidobenzylamine.
4. The process as defined in claim 1 wherein the primary amine is a lower 4'-alkoxy-4-amino-stilbene.
5. The process as defined in claim 1 wherein the primary amine is 4'-methoxy-stilbylamine.
6. The process as defined in claim 1 wherein the primary amine is 4'-ethoxy-stilbylamine.
7. The process as defined in claim 1 wherein the primary amine is cholesterylimine.
8. The process as defined in claim 1 wherein the primary amine is desacetylcolchicine.

References Cited in the file of this patent

Gautier et al.: Compt. Rendues, 226, pp. 1736–38 (1948).
Vompe: Chemical Abst. 43, col. 6626–27 (1949).